(12) United States Patent
Pommeret et al.

(10) Patent No.: US 7,036,873 B2
(45) Date of Patent: May 2, 2006

(54) PIECE OF MOTOR VEHICLE BODYWORK PRESENTING A MARKED APPEARANCE OF DEPTH

(75) Inventors: Maelig Pommeret, Lyons (FR); Charlotte Thevenet, Charnoz (FR); Arnold Fayt, Jujurieux (FR); Thibault Lacroix, Chateau-Gaillard (FR)

(73) Assignee: Compagnie Plastic Omnium, Lyons (FR)

( * ) Notice: Subject to any disclaimer, the term of this patent is extended or adjusted under 35 U.S.C. 154(b) by 2 days.

(21) Appl. No.: 10/305,071

(22) Filed: Nov. 27, 2002

(65) Prior Publication Data

US 2004/0007898 A1 Jan. 15, 2004

(30) Foreign Application Priority Data

Nov. 29, 2001 (FR) .................................. 01 15461

(51) Int. Cl.
*B60R 27/00* (2006.01)
(52) U.S. Cl. ................................. 296/191; 296/193.09
(58) Field of Classification Search ................ 296/191, 296/193.03, 193.04, 193.09, 193.1, 193.11
See application file for complete search history.

(56) References Cited

U.S. PATENT DOCUMENTS

| | | | |
|---|---|---|---|
| 3,686,051 A | | 8/1972 | Samuel et al. |
| 3,867,240 A | * | 2/1975 | Doerfling ...................... 428/71 |
| 3,875,280 A | * | 4/1975 | Story ........................... 264/92 |
| 4,584,225 A | * | 4/1986 | Adelman ...................... 428/71 |
| 4,705,716 A | * | 11/1987 | Tang ........................... 428/251 |
| 5,000,809 A | * | 3/1991 | Adesko et al. ............... 156/230 |
| 5,230,906 A | * | 7/1993 | Mueller ........................ 425/89 |
| 5,385,774 A | * | 1/1995 | Cramer et al. ............... 428/247 |
| 5,894,048 A | * | 4/1999 | Eckart et al. ................ 428/339 |
| 6,007,899 A | * | 12/1999 | Yoshizawa et al. .......... 428/192 |
| 6,168,231 B1 | | 1/2001 | Fielding et al. |
| 6,319,592 B1 | * | 11/2001 | Ney et al. .................... 428/195 |
| 6,398,287 B1 | * | 6/2002 | Smith et al. ............ 296/100.01 |
| 6,457,768 B1 | * | 10/2002 | Schroeder et al. ........... 296/214 |
| 6,534,158 B1 | * | 3/2003 | Huang et al. ................ 428/201 |
| 6,551,432 B1 | * | 4/2003 | Spain et al. ................. 156/230 |
| 6,582,801 B1 | * | 6/2003 | Schmitt ....................... 428/195 |
| 6,588,831 B1 | * | 7/2003 | Ochoa ..................... 296/203.03 |
| 6,595,575 B1 | * | 7/2003 | Morris ......................... 296/136 |
| 6,605,342 B1 | * | 8/2003 | Burghaus et al. ............ 428/214 |
| 6,769,731 B1 | * | 8/2004 | Myers et al. ........... 296/100.09 |
| 2002/0110694 A1 | * | 8/2002 | Falaas et al. ............... 428/425.8 |
| 2002/0119306 A1 | * | 8/2002 | Enewoldsen et al. ........ 428/335 |
| 2002/0127372 A1 | * | 9/2002 | Waite et al. ................. 428/172 |
| 2002/0164466 A1 | * | 11/2002 | Jaekel ......................... 428/203 |
| 2003/0017312 A1 | * | 1/2003 | Labrousse et al. ........... 428/195 |
| 2003/0026932 A1 | * | 2/2003 | Johnson et al. ............. 428/40.1 |
| 2003/0039806 A1 | * | 2/2003 | Weder .......................... 428/172 |
| 2003/0072919 A1 | * | 4/2003 | Watts, Jr. et al. ............ 428/159 |

FOREIGN PATENT DOCUMENTS

| | | |
|---|---|---|
| DE | 198 40 636 C1 | 3/2000 |
| GB | 1168352 | 10/1969 |
| WO | WO 01/92087 A1 | 12/2001 |

\* cited by examiner

*Primary Examiner*—H. Gutman
(74) *Attorney, Agent, or Firm*—Oliff & Berridge PLC

(57) ABSTRACT

A piece of motor vehicle bodywork (4, 5, 11) having an outside face directed towards the outside of the vehicle and an inside face opposite the outside face, the piece of bodywork being constituted in that it is constituted by a skin made of a material that allows light to pass, the inside face of the skin being covered at least in part by an opaque coating.

4 Claims, 1 Drawing Sheet

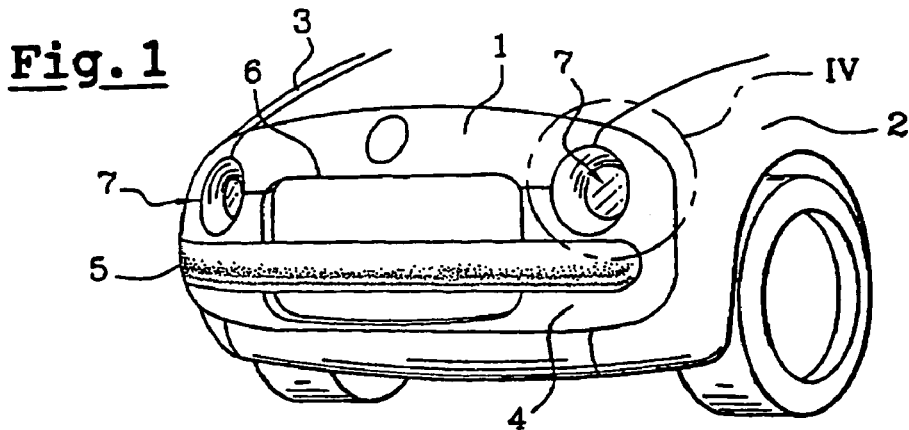
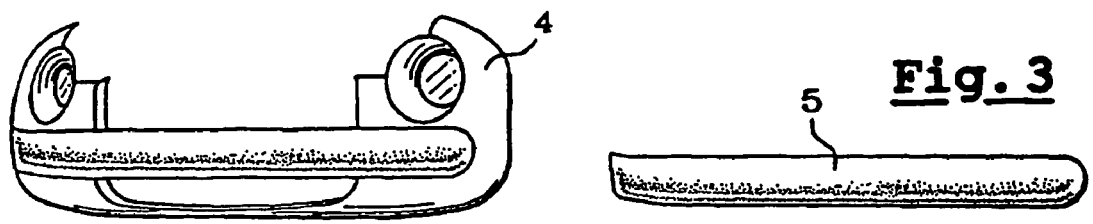
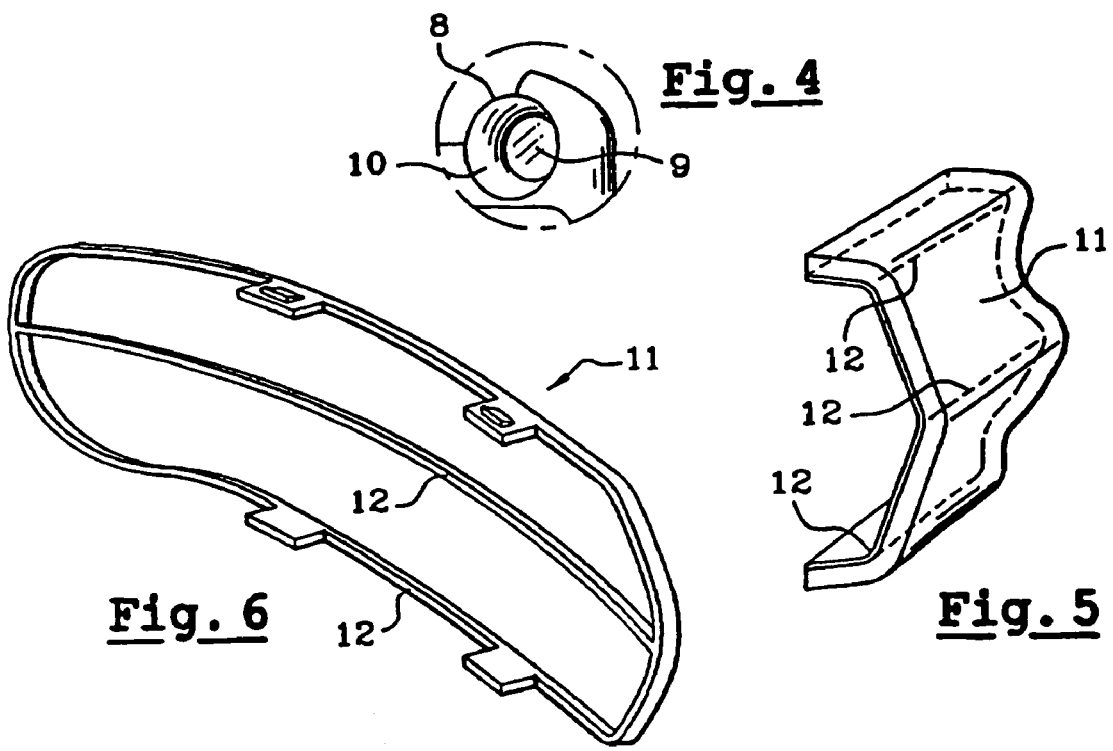

PIECE OF MOTOR VEHICLE BODYWORK PRESENTING A MARKED APPEARANCE OF DEPTH

BACKGROUND OF THE INVENTION

The present invention relates to a piece of motor vehicle bodywork presenting a marked appearance of depth. In particular, the invention relates to a piece of bodywork preferred to as "capping".

Appearance is a criterion that is becoming ever more important for the consumer when selecting a vehicle.

That is why the automobile industry is devoting a large amount of effort to developing pieces of bodywork of appearance that is as perfect and as durable as possible so as to produce an impression of quality that benefits the entire vehicle, including aspects that are purely functional and independent of appearance.

Not only is the color of the paint important, but it is also important, for example, that it should continue to look good over time and under all weather conditions, or at color seams between pieces painted in-line and pieces painted off-line and fitted to the structure.

In this context, it is known in particular that paints are particularly attractive to consumers when they present depth. Metallic paints and varnishes have traditionally been considered as presenting appearance that is rich. They are also often associated with top-of-range models of vehicles.

Major progress has been achieved in the field of paints applied to pieces of bodywork, but always on the principle of the layer of paint being present on the face of the painted piece that lies on the outside of the vehicle.

OBJECTS AND SUMMARY OF THE INVENTION

This leads to certain limits which the present invention seeks to overcome.

The present invention provides a piece of motor vehicle bodywork comprising an outside face directed towards the outside of the vehicle and an inside face opposite the outside face, said piece of bodywork being characterized in that it is constituted by a skin made of a material that passes light, and covered at least in part by an opaque coating on its inside face.

In the invention, the term "material that passes light" is used to mean a material that is transparent or translucent.

By means of the invention, the opaque coating layer is protected from the scratches, the splashes, and the impacts to which a piece of bodywork is usually subject.

The protection also acts against chemical attack, which the skin is better at withstanding than the coating.

Similarly, by using a plastics material that allows light to pass but that filters out ultraviolet (UV) radiation, the coating benefits from protection against exposure to V, thus making it possible, for example, for the coating to be constituted by a paint that does not withstand such radiation.

The protection provided by the skin of the piece of bodywork constitutes a considerable advantage of the invention since it opens up a wide range of materials that can be used to make the coating, including materials which the person skilled in the art has avoided using on pieces of bodywork because of their fragility. Thus, particular mention can be made to the following, without this list being exhausted:

metal layers made by deposition;

coatings conventionally used inside the cabin, such as cloth, thus giving the vehicle matching inside and outside appearance;

light-emitting films which are too fragile to be exposed to mechanical attack on the outside of the vehicle while they are nevertheless useful for providing signaling functions in addition to lamp inserts;

phosphorescent paint, of innovating appearance; and materials filled with natural fibers, providing an ecological connotation.

Apart from such fragile coatings, more conventional coatings can naturally also be used, such as paints or fitted or overmolded plastics materials, e.g. in the form of films.

Any method can be envisaged for associating the skin of the piece of bodywork of the invention with the coating, with the selection of the method that is the most appropriate given the nature of the coating being within the competence of the person skilled in the art.

Nevertheless, it is preferable for the technique used to guarantee quite intimate contact between the skin and the coating so that the interface between them does not prevent the coating from being seen.

Thus, it is equally possible to use the technique of depositing material, e.g. paint, or the technique of overmolding material, and regardless of whether the overmolded insert forming the coating is a hot insert or a cold insert.

The term "hot" insert is used to designate an insert of plastics material which is overmolded immediately after it leaves a preceding mold recess in which it has just been made, even before cooling down. This technique of hot insert overmolding is sometimes referred to as "rotary" overmolding because of the rotary motion performed by the handling tool which passes the insert from the first mold recess to the overmolding recess.

A "cold" insert is a piece which is placed in the mold long after it has been made, for example a film that is obtained by extruding material, and which is optionally thermoformed by the shape of the overmolding recess.

If the coating is suitable, another acceptable technique is to apply the coating to the skin after the skin has been made. Under such circumstances, it is appropriate to use welding or a transparent adhesive.

With a painted coating, the appearance of depth given by the piece of the invention is remarkable and much deeper than can be achieved with paint applied in the traditional manner given the fineness of the paint.

The invention makes it possible to obtain novel effects, some examples of which are described below.

Firstly, it is possible to form a pattern in relief on the inside face of the skin. This pattern can modify the transparency of the skin and/or deform light rays so as to modify the brightness of the coating locally.

Similarly, with a skin that is translucent, used in combination with a metallic paint, it is possible to obtain a mother-of-pearl appearance.

Another interesting look is obtained by starting from a translucent material which is molded in a recess that presents certain locations with a mirror polish surface, i.e. a state that is extremely smooth. Under such circumstances, the skin becomes transparent in the locations that correspond to the smooth zones of the recess. Where needed, it is possible to combine the effect of smooth zones with local thinning of the skin, thereby contributing to further improving its transparency. The skin as obtained in this way then presents transparent zones integrated in a translucent whole.

It is also possible to provide graining on the outside face of the skin, thereby providing a fuzzy effect while also making the piece less liable to damage by scratching.

Naturally, the variants mentioned above can be combined with one another.

It is remarkable that the piece of bodywork of the invention can be manufactured without using any additional operation over making a conventional piece of bodywork out of plastics material.

For example, when considering a painted piece, the piece is first molded, and then it is painted, the only differences being that the molded plastics material is a material that passes light, e.g. a translucent copolymer, and the paint is applied to the inside face of the piece instead of its outside face.

Similarly, when considering a piece coated in an overmolded film, the film is placed in the mold recess and the plastics material is introduced into the mold, with the only differences relating to the material which passes light and to the position of the film in the recess.

In general, it can be considered that the similarity in manufacturing a piece of the invention and an equivalent prior art piece has the consequence in economic terms that the cost price of a piece of the invention, ignoring material cost, is entirely comparable with the cost of a prior art piece made of plastics material.

In a first embodiment, the coating covers the entire inside face of the skin.

In a second embodiment, the coating covers only part of the inside face of the skin and leaves certain zones of the said inside face uncovered. These zones may be used for placing lamp inserts behind the piece of bodywork, e.g. headlights, which make use of the transparent or translucent property of the piece of bodywork. It is also possible to use these zones for receiving sensors, e.g. optical or capacitive sensors behind the piece of bodywork.

It is advantageous for the uncovered zones to coincide with the transparent zones obtained using a recess that has a mirror polish surface, as explained above.

The present invention provides in particular a piece of capping for applying to the outside face of another piece of bodywork, the capping being characterized in that it is a piece of bodywork as described above.

BRIEF DESCRIPTION OF THE DRAWINGS

To facilitate understanding the invention, there follows a description of embodiments given as non-limiting examples and with reference to the accompanying drawing, in which:

FIG. 1 shows the front of a motor vehicle;

FIG. 2 shows one of the pieces of bodywork of the FIG. 1 vehicle;

FIG. 3 shows the capping of the FIG. 1 vehicle;

FIG. 4 is a view showing a detail IV of FIG. 1;

FIG. 5 is a perspective view of a portion of another piece of capping; and

FIG. 6 shows the FIG. 5 capping seen from the inside.

MORE DETAILED DESCRIPTION

The vehicle shown in FIG. 1 has bodywork made up at the front of a drop hood 1, fenders 2 and 3 at the sides, and a front face 4.

The front face 4 also supports capping 5 which, at least in terms of appearance, is reminiscent of a conventional bumper skin.

A radiator grille 6 finishes off the front of the vehicle, being defined between the hood 1 and the front face 4. The capping 5 masks this grille 6 in part.

In the example described, the front face 4 and the capping 5 are both constituted by means of a skin made of polypropylene copolymer such as the material sold under the trademark CLYRELL by the supplier Basell, which is a translucent plastics material.

The outside faces of these pieces are left unpainted, while their inside faces (not visible in FIGS. 1 to 4) are covered in a metallic paint.

This gives rise to the mother-of-pearl appearance mentioned above.

In addition, the capping 5 is grained on its outside face, giving it a fuzzy appearance that is of interest both from a purely esthetic point of view and also from a technical point of view since surface damage to the capping due to its making contact with external objects and giving rise to scratching becomes less visible.

Whereas the capping 5 is painted over its entire inside face, the front face 4 has two zones 7 that are not painted, at locations that correspond to the headlamp insert of the vehicle.

These locations 7 are formed near the top of the front face in an edge 8 close to the hood 1. Each location is in the form of a depression having frustoconical edges 10 and a bottom 9 closed by a flat web. Paint is applied to the entire inside face of the piece, including the frustoconical edges 10, but it does not cover the webs forming the bottom walls 9 of the depressions.

The front face is thus opaque with a mother-of-pearl effect over its entire surface, with the exception of the bottom walls of the shaped depressions of zones 7.

These bottom walls 9 of the depressions shelter headlamp inserts placed behind the front face and they can serve as the front glasses of such inserts.

In its portion corresponding to the bottom walls 9, the skin presents a special feature: it is transparent, whereas elsewhere it is merely translucent.

This transparency is the result of the corresponding region of the recess in the mold in which the skin was formed having a mirror polish surface, and from the skin being locally of reduced thickness.

In the example of FIGS. 5 and 6, the capping 11 presents the additional original feature of having patterns in relief on its inside face, in the form of longitudinal ribs 12.

Paint on shapes in relief is particularly exposed to wear and rubbing. By means of the invention, the paint is protected from such external attack, even where it covers shapes in relief.

The two embodiments described above are provided solely by way of example and they may be modified in any desirable manner without thereby going beyond the ambit of the invention.

What is claimed is:

1. A piece of bodywork of a motor vehicle having an outside face directed towards an outside of the vehicle and an inside face opposite to the outside face, the piece being rigid and constituted by a skin of a material that passes light, an inside face of the skin being covered at least in part by an opaque coating, and said inside face of the skin including a pattern in relief, and the skin is constituted by a translucent material which presents transparent zones integrated in a translucent whole.

2. A piece of bodywork of a motor vehicle having an outside face directed towards an outside of the vehicle and an inside face opposite to the outside face, the piece being rigid and constituted by a skin of a material that passes light, an inside face of the skin being covered at least in part by an opaque coating, and said inside face of the skin including a pattern in relief, and the coating covers the inside face of the skin in part, leaving certain zones of said inside face uncovered.

3. A piece of bodywork of a motor vehicle having an outside face directed towards an outside of the vehicle and an inside face opposite to the outside face, the piece being rigid and constituted by a skin made of a material that passes light, an inside face of the skin being covered at least in part by an opaque coating, said inside face including a pattern in relief, in which the skin presents local thinning.

4. A piece of bodywork of a motor vehicle having an outside face directed towards an outside of the vehicle and an inside face opposite to the outside face, the piece being rigid and constituted by a skin of a material that passes light, an inside face of the skin being covered at least in part by an opaque coating, and said inside face of the skin including a pattern in relief, wherein the skin is constituted by a translucent material which presents transparent zones integrated in a translucent whole, said skin being obtained by being molded in a recess that presents locations having a mirror polish surface.

* * * * *